J. R. JOHNS.

Car-Starter.

No. 9,138. Reissued April 6, 1880.

Attest:

Thad. S. Foulard

J. Aurhountz

Inventor:

Jacob R. Johns.

H. PETERS, PHOTO-LITHOGRAPHER, WASHINGTON, D. C.

UNITED STATES PATENT OFFICE.

JACOB R. JOHNS, OF MILLERSBURG, PENNSYLVANIA.

CAR-STARTER.

SPECIFICATION forming part of Reissued Letters Patent No. 9,138, dated April 6, 1880.

Original No. 192,375, dated June 26, 1877. Application for reissue filed February 25, 1879.

*To all whom it may concern:*

Be it known that I, JACOB R. JOHNS, of Millersburg, Dauphin county, Pennsylvania, have invented Improvements in Car-Starters, of which the following is a specification.

This improvement relates to that class of inventions designed to relieve the horses used in railroad, street, and other cars from the heavy strain to which they are subjected at each starting.

Figure 1:
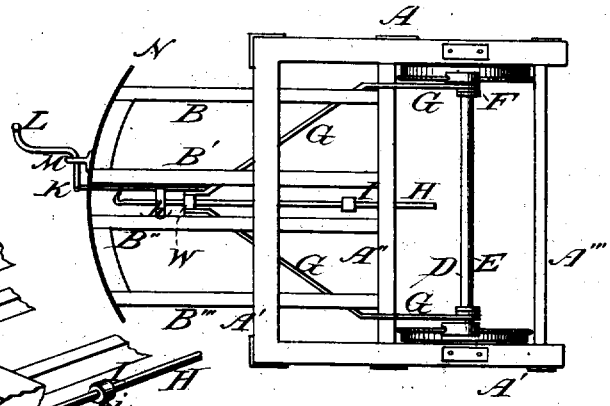
Figure 4:
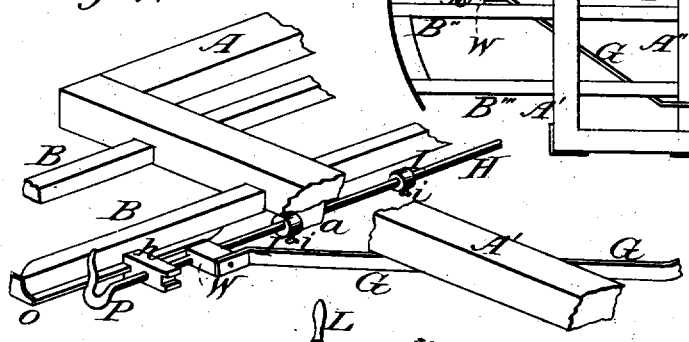
Figure 5:
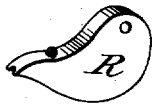
Figure 2:
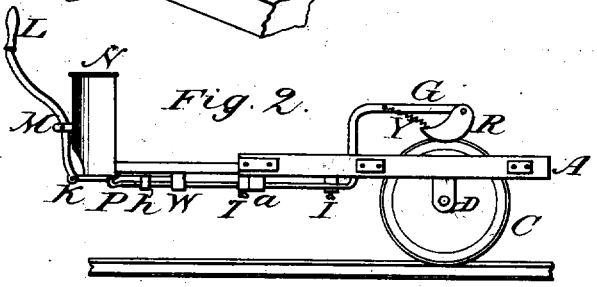
Figure 6:
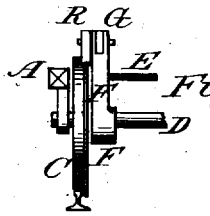
Figure 3:
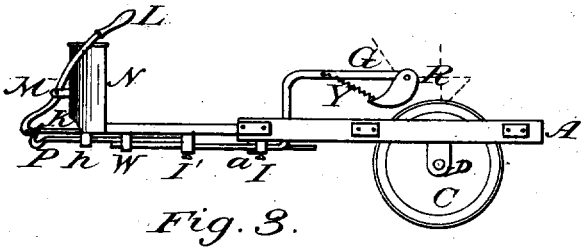

In the accompanying drawings, which form part of this specification, Figure 1 is a top or plan view; Fig. 2, a side elevation, showing the car ready to start; Fig. 3, the same, showing the position after starting; Fig. 4, enlarged perspective view to show the draft-pole and its appliances; Fig. 5, a view showing a suitable form of the eccentric clutch or cam; Fig. 6, an edge view of one of the front wheels and appliances.

A portion of the frame-work of an ordinary street-railroad car is shown by the letters A and B, the latter representing timbers supporting the platform.

N represents the ordinary fender or shield, and mounted thereon, as usual, the lever of an ordinary car-brake is shown at L, which may be of any approved form.

The draft-pole H forms part of a frame having arms G G. Suitable guides or bearings (shown at *a*, *o*, and *h*) support it underneath the platform. Adjustable stops to regulate the extent of the sliding movement of this pole, based on the resistance of timbers A, are shown at I I. The pole H has a coupling at the front for attaching the double or single tree. To the brake-lever L is connected the pole H, so as to operate the brake and draw the frame, with clutches R, back by hand with one motion of the lever, as hereinafter described. When a pole is used it may be directly connected to the draft-rod as a continuation of the same.

A square surface at W on the draft-rod H is shown, to which is firmly secured on each side, by a bolt or otherwise, the side arms, G, diverging at their union, as shown by Fig. 1, under the timbers B and A, to each side, then bending vertically, then horizontally back, and connected on each side of the car with arms F F, pivoted at their lower ends, and each carrying at their upper end a pivoted and eccentric clutch, R, arranged to rest on the flanges of the car-wheels. The clutches, when carried forward with the draft-pole, gripe the flanges of the car-wheels and firmly lock themselves thereto, so that the wheels are turned and carried forward on the rails until the wheels begin to turn faster than the forward motion of the clutches R, when they will turn beneath the latter and the draft is transferred to the frame of the car. The levers F are connected by a cross-rod, E, above the axle D. (See Fig. 6.)

The guide-bars *o o*, attached to the under side of the platform between the central flooring-beams, in connection with a corresponding sliding head, *h*, besides supporting the pole H, also insure a direct draft. The draft-pole H is connected by rod or link K, or its equivalent, to the lever of an ordinary car-brake, (shown at L,) so that the pole or frame is thrown back into proper position for forward action by the driver when operating the brake usually found on cars for arresting their motion. When the pole is used as a unit with the central draft-rod it is clear that when the vehicle is in rapid motion and the horses brought to a stand there is sufficient momentum in the vehicle to cause it to run forward. Thus the pole and side bars moving so easily in the guides and sliding head in a true or direct line of action, and no weight or friction to be overcome, the eccentric clutches would not only be brought into their proper position for forward action, but also act automatically as a starter and brake both. It will be seen that when the car is on an incline any backward movement will be automatically arrested by the action of the clutches.

I do not limit myself to the particular form of pivoted eccentric clutch or cam, clutch-carrier, and draft arrangement herein given.

I am aware that the patent of February 19, 1867, No. 62,303, resembles my invention in the application of the tractive force by means of eccentric clutches, draw-pole, and stop arrangement; but it does not show the clutches applied to the flanges projecting from the outer periphery of the car-wheels; neither does it show a connection with the usual car-brake.

Having thus described my invention, what

I claim as new, and desire to secure by Letters Patent, is—

1. The combination, in a car, with its wheels and the draft-rod having an upwardly-bent arm, of a pivoted eccentric clutch hung above the wheel on said bent arm of the draft-rod, and held by a spring connected to said arm from contact with the wheel when the car is in motion, and acting upon the wheel as the momentum of the stopping car brings the wheel in contact with the clutch, and to start the car by grasping the wheel as draft is applied, substantially as shown and described.

2. The combination, in a car, with its wheels and the draft-rod having an upwardly-bent arm, of a pivoted eccentric clutch hung above the wheel upon said bent arm of the draft-rod and held by a spring from contact with the wheels while the car is in motion, and the hand-lever connected to the clutch-arm, as set forth and described.

3. The radial arms F on the inside of each wheel, united by a cross-rod, E, and each arm embracing the axle D of the wheels and having their upper ends slotted and supporting an eccentric clutch or pawl, R, and actuating-lever G, in combination with the draft pole or rod H, all arranged in such manner as to cause said clutch R to gripe the periphery of the car-wheel and carry it forward upon starting, said clutch being held in position by a spring, Y, when released, substantially as described.

4. The combination, with the radial arms F, clutch R, lever-arms G, elevated above and carried down on each side and converging to a union with the draft-pole H, of the cross-head *n*, the guide-bars *o*, and appliances, all substantially as and for the purpose set forth.

In testimony whereof I have signed my name to this specification in the presence of two subscribing witnesses.

JACOB R. JOHNS.

Witnesses:
THAD. S. FREELAND,
J. AUCHMUTZ.